UNITED STATES PATENT OFFICE.

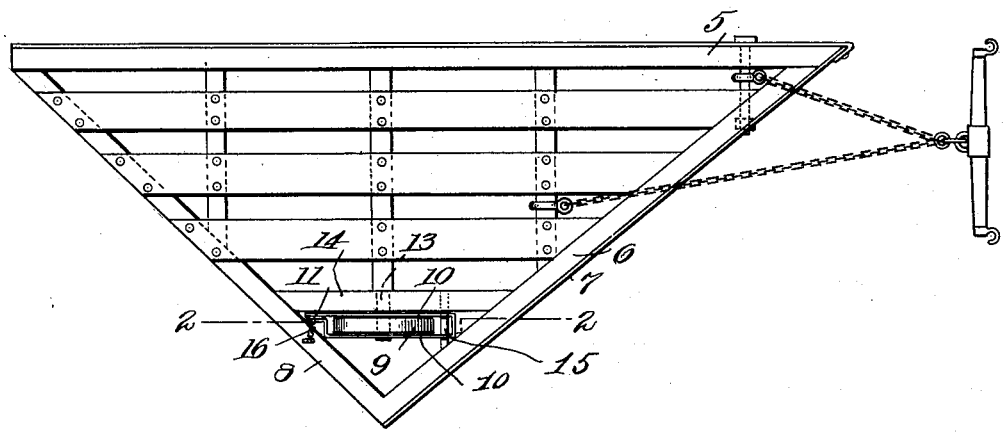

HENRY C. BARNETT, OF JEFFERSON, GEORGIA.

ROAD-SCRAPER.

998,228.　　　　Specification of Letters Patent.　　Patented July 18, 1911.

Application filed March 7, 1911. Serial No. 612,746.

*To all whom it may concern:*

Be it known that I, HENRY C. BARNETT, a citizen of the United States, residing at Jefferson, in the county of Jackson and State of Georgia, have invented certain new and useful Improvements in Road-Scrapers, of which the following is a specification.

This invention relates to implements for grading and smoothing roads, such as the one disclosed in my Patent No. 362299, dated June 21, 1910; and it is the object of the present invention to provide improved means whereby the implement may be raised and lowered at the operator's will.

In the accompanying drawing, forming a part of this specification—Figure 1 is a plan view of the implement, and Fig. 2 is an enlarged section on the line 2—2 of Fig. 1.

Referring specifically to the drawing, it will be seen that the implement is triangular in shape and comprises a landside 5, a mold board 6 carrying a scraper blade 7, and a rear brace beam 8.

At the apex of the mold board 6 and the beam 8 is located a wheel 9 which is vertically adjustable in order that the implement may be raised or lowered at the will of the operator. The wheel is carried by a pivoted frame comprising spaced members 10 connected at one of their ends, and having their opposite ends brought together and connected to a lever 11, said lever being located between the last-mentioned ends and rigidly secured thereto by bolts or other suitable fastening means 12. Substantially midway between their ends, the frame members 10 carry an axle 13 on which the wheel 9 is mounted, said axle extending across the members, and the wheel being located therebetween. Between the mold board 6 and the rear brace beam 8 extends a small brace 14, and this brace and the beam 8 support the pivot 15 of the frame which carries the wheel 9. The wheel-supporting frame is pivoted at its end opposite the end to which the lever 11 is connected, and the pivot is so arranged that the frame may swing in a vertical plane.

In order to hold the wheel carrying frame in adjusted position, there is provided a chain 16 which is made fast to the beam 8 and is adapted to be adjustably connected to a hook 17 carried by the lever 11. To raise the implement, it is necessary only to pull the lever back and then hook the chain shorter, and to lower the frame, the chain is lengthened.

The device herein described is simple in construction and can be readily applied to the implement, and by its use the implement can be readily raised or lowered. The lever 11 is removable in order that the implement may be reversed as described in my patent herein referred to.

I claim:

In a road scraper, a pivoted frame mounted thereon, said frame swinging in a vertical plane, a wheel carried by the frame, a lever carried by the free end of the frame, a hook on the lever, and a take-up device connected to the scraper and adjustably engageable with the aforesaid hook.

In testimony whereof I affix my signature in presence of two witnesses.

HENRY C. BARNETT.

Witnesses:
　WILLIAM D. GRIFFITH,
　JOHN D. POTTS.

Copies of this patent may be obtained for five cents each, by addressing the "Commissioner of Patents, Washington, D. C."